United States Patent [19]

Orlowski et al.

[11] 4,431,104

[45] Feb. 14, 1984

[54] INDEXING CONVEYOR SYSTEM

[75] Inventors: Gerald J. Orlowski, Scottsdale, Ariz.; Rodney D. Wicklund, Denver, Colo.

[73] Assignee: Armour and Company, Phoenix, Ariz.

[21] Appl. No.: 292,812

[22] Filed: Aug. 14, 1981

Related U.S. Application Data

[63] Continuation of Ser. No. 92,072, Nov. 7, 1979, abandoned.

[51] Int. Cl.³ .............................................. B65G 47/26
[52] U.S. Cl. ..................................... 198/427; 198/431; 198/435; 198/447; 198/592
[58] Field of Search ................................. 198/425–427, 198/431, 435–437, 447, 457, 369, 594, 627, 812, 813, 816, 817, 367, 372, 597, 357, 586, 601, 774, 836, 592

[56] References Cited

U.S. PATENT DOCUMENTS

| | | | |
|---|---|---|---|
| 1,254,014 | 1/1918 | Anderson | 198/813 |
| 2,724,486 | 11/1955 | Hatch et al. | 198/369 |
| 2,940,580 | 6/1960 | Francois | 198/627 |
| 3,086,640 | 4/1963 | Verrinder | 198/597 |
| 3,179,234 | 4/1965 | Bloom et al. | 198/436 |
| 3,404,275 | 10/1968 | McClellan | 198/369 |
| 3,416,640 | 12/1968 | Svobida | 198/431 |
| 3,519,119 | 7/1970 | Hershey | 198/357 |
| 3,547,249 | 12/1970 | Aguilar et al. | 198/774 |
| 3,580,141 | 5/1971 | Richter | 198/435 |
| 3,581,876 | 6/1971 | Keith | 198/627 |
| 3,703,951 | 11/1972 | Brockmuller | 198/447 |
| 3,734,264 | 5/1973 | Stumpf | 198/435 |
| 4,174,774 | 11/1979 | Bourgeois | 198/457 |

*Primary Examiner*—Joseph E. Valenza
*Attorney, Agent, or Firm*—Merriam, Marshall & Bicknell

[57] ABSTRACT

An indexing conveyor system wherein a feed conveyor section receives items, which are rapidly dispensed from a source thereof, and transports the items, one behind the other, on a plurality of endless belts to a pivotal conveyor section. A counter counts the items moving on the pivotal conveyor section and effects rapid pivotal movement of the pivotal conveyor section when a predetermined number of items have been counted. The distal end of the pivotal conveyor section pivots between positions aligned first with one and then the other of a pair of elongated receiving conveyor sections arranged in tiers and each having a plurality of longitudinally extending, laterally spaced endless belts. A guard conveyor section closely overlies the pivotal conveyor section, is movable in unison therewith, and prevents items from being thrown off of the pivotal conveyor section when the latter pivots between its respective positions. A plurality of longitudinally extending, laterally spaced rods are disposed between the upper portions of the endless belts of each receiving conveyor section and rotate in the same direction about their longitudinal axes. Vertically shiftable, plate-like members associated with each receiving conveyor section alternately elevate and depress the upper portions of the endless belts thereof so that the rotating rods of each receiving conveyor section are alternately rendered effective and ineffective to change the direction and transport items transversely off of the receiving conveyor section in a row and onto an adjacent take-off conveyor section. The takeoff conveyor sections transport and alternately deposit the rows of items onto a final conveyor section, which extends in the same direction as the take-off conveyor sections.

16 Claims, 9 Drawing Figures

INDEXING CONVEYOR SYSTEM

This is a continuation of application Ser. No. 92,042, filed Nov. 7, 1979 now abandoned.

BACKGROUND OF THE INVENTION (1) Field of the Invention

This invention relates to conveyor systems, and more particularly relates to a conveyor system for receiving hamburger patties, which are rapidly dispensed from a forming apparatus, and transporting the same, in groups, to a point of use or a station for further processing.

(2) Description of the Prior Art

Molding machines or apparatus have been heretofore developed for producing food items, such as hamburger patties, from an agglomerable mass of edible material. After formation, the formed patties were dispensed or otherwise place on a conveyor on which they were transported to a different area or station for further processing, such as broiling and/or freezing and subsequent packaging. More recently, molding machines or apparatus have been developed which are capable of forming hamburger patties at a very high rate. An example of a molding machine or apparatus capable of the aforementioned high volume operation is disclosed in the Orlowski U.S. Pat. No. 4,065,241 and the Orlowski et al U.S. Pat. No. 4,193,167, both of which are assigned to the assignee of this application.

While it is desirable to produce patties at a high rate of speed, so far as is known, no conveyors are presently available which can receive and transport patties in a particular arrangement after being formed so that subsequent operations can be performed on the patties in a most efficient manner.

A somewhat similar problem has been encountered in the commercial breadmaking field where it is frequently necessary to rapidly remove loaves of baked bread from a cooler after baking. Conveyor systems suited for this purpose which employ a movable selector conveyor for delivering the loaves of bread in groups to one or more shelves of a tiered receiving conveyor are disclosed in the Hatch et al U.S. Pat. Nos. 2,724,486 and 2,739,694, and the Waite U.S. Pat. No. 3,272,307.

Conveying or stacking apparatus have also been developed for rapidly stacking articles after one or more operations have been performed thereon. An example of such an apparatus is disclosed in the Hoke et al U.S. Pat. No. 3,905,487, wherein the swingable end of a pivotally mounted feed conveyor moves between raised and lowered positions so as to selectively feed shingles either to an elevated platform or another conveyor disposed below the elevated platform. An electric eye is utilized in the Hoke et al stacking apparatus to sense gaps between the groups of shingles being conveyed and to change the position of the receiving conveyor in increments in accordance with the gaps sensed by the electric eye.

Conveyor systems and mechanisms have also been heretofore developed wherein the path of movement of items or articles being transported thereon were caused to change direction and move in a new direction transverse to the original path. Such a direction changing or flow dividing mechanism is disclosed in the Brand U.S. Pat. No. 4,016,969, wherein a plurality of rollers, which transport the articles in one direction, are lowered as a unit so as to permit the articles to contact the upper portions of a plurality of endless belts, which extend in a direction transverse to the original direction and serve to transport the articles in the transverse direction.

The Goldinger et al U.S. Pat. No. 3,921,789 discloses an apparatus or mechanism for changing the direction of movement of articles on a conveyor which is similar to the corner turning table or direction changing mechanism disclosed in the Brand U.S. Pat. No. 4,016,969.

The Balch et al U.S. Pat. Nos. 3,934,705 and 3,985,052 disclose conveyor systems for transporting bacon strips, wherein the strips undergo two changes of direction as they are transported along the stations of the system. A plurality of rotating, noncircular rods are utilized in the direction changing or transfer sections of the conveyor systems.

The aforementioned prior art conveyor systems and direction changing mechanisms lack the capability of being able to receive and transport items dispensed at a high rate of speed, such as in the range of 400 to 450 items per minute. The direction changing mechanisms utilized in the prior art conveyors are likewise incapable of changing the direction of items moving on one path to another path transverse to the one path at the rates contemplated for the indexing conveyor system of the present invention. Moreover, many of the direction changing mechanisms heretofore advanced were objectionable from the standpoint of being complex in construction and unreliable in operation.

SUMMARY OF THE INVENTION

The present invention contemplates an improved indexing conveyor system for transporting items which are rapidly dispensed from a source thereof to a point of use without interruption of the flow from the source. Specifically, the indexing conveyor system of the present invention is suited for use with a patty-forming apparatus having an output in the range of 400 to 450 patties per minute. In order to transport and accommodate items at the foregoing rate, the conveyor system herein disclosed utilizes an elongated feed conveyor section having a plurality of longitudinally extending, laterally spaced, endless belts, which serve to transport items received from a source thereof to an elongated pivotal conveyor section. The pivotal conveyor section likewise includes a plurality of longitudinally extending, laterally spaced, endless belts, the adjacent ends of which are interdigitally arranged with the belts of the feed conveyor section and are driven from the same source. Thus, the belts of the feed and pivotal conveyor sections travel at the same speed.

Actuating means is connected to the pivotal conveyor section and serves to rapidly pivot the same between positions in which the distal or downstream end thereof is aligned first with one and then the other of a pair of receiving conveyor sections, which are arranged in tiers. Each receiving conveyor section includes a plurality of longitudinally extending, laterally spaced, endless belts, which extend in the direction of movement of the items being transported on the pivotal conveyor section and which receive a predetermined number of items from the pivotal conveyor section.

Since the actuating means for the pivotal conveyor section effects rapid pivotal movement of the pivotal conveyor section between its aligned positions with receiving conveyor sections, a guard section is connected to and closely overlies the pivotal conveyor section. The guard section thus moves in unison with the pivotal conveyor section and prevents items on the pivotal conveyor section from being ejected therefrom during rapid movements of the pivotal conveyor section between its respective operating positions.

Each receiving conveyor section also includes mechanism for changing the direction of movement of items being transported by the endless conveying elements thereof. Each mechanism includes a plurality of elongated, rotatable members or rods, which are disposed between the upper portions of the conveying elements of their receiving conveyor section and which serve to engage and transport items moving on the conveying elements transversely off of the receiving conveyor section in a row. Each direction changing mechanism includes a plurality of vertically shiftable, plate-like members for elevating and depressing the upper portions of the conveying elements with respect to the upper surfaces of the associated rotatable members in order to render the rotatable members effective or ineffective to change the direction of items on the receiving conveyor section. When engaged with items on the receiving conveyor section, the rotating rods transport the items onto a downwardly inclined take-off conveyor section in a row and thence onto a final conveyor section. The items on the final conveyor section are thus arranged in a series of rows.

Accordingly, it is a general object of the present invention to provide a novel and improved indexing conveyor system for receiving and transporting items, such as hamburger patties, which are rapidly dispensed from a source thereof so that the flow of patties is not interrupted or slowed and so that the patties are in a particular arrangement.

Another object is to provide a novel indexing conveyor system of the foregoing character, wherein a rapidly pivotal conveyor section serves to direct a predetermined number of items first to one and then the other of a pair of tiered, receiving conveyor sections and wherein a guard conveyor section overlies and is movable in unison with the pivotal conveyor section for preventing the items being transported on the pivoted conveyor section from being thrown off of or otherwise ejected from the pivotal conveyor section.

Still another object is to provide a novel direction changing mechanism for use in an indexing conveyor system of the character described, wherein a plurality of rods are rotatably mounted between the upper portions of a plurality of laterally spaced endless conveyor belts carried by a receiving conveyor section of the system and wherein the upper portions of the belts are vertically shiftable relative to the upper surfaces of the rods in order to render the rods effective to change the direction of movement of items being transported by the receiving conveyor section.

A further object is to provide a novel and improved indexing conveyor system for receiving rapidly dispensed items from a source thereof and transporting the same to a point of use, which is simple in construction, reliable in operation, and economical to manufacture.

These and other objects will become apparent from the following detailed description and accompanying sheets of drawiings wherein:

DETAILED DESCRIPTION

Figure 1:
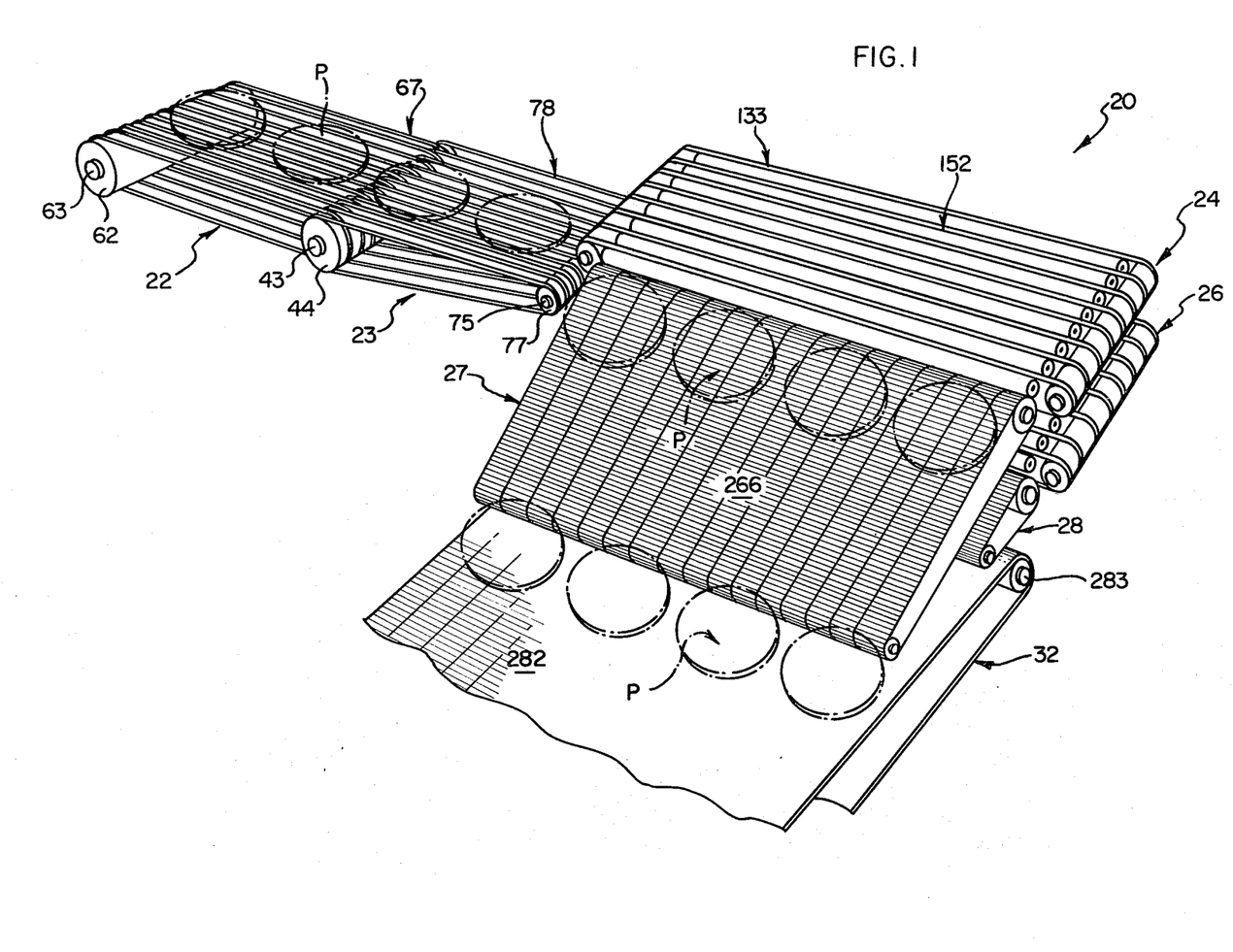
FIG. 1 is a semi-diagrammatic, perspective view of an indexing conveyor system for receiving and transporting rapidly dispensed items, such as hamburger patties, from a source thereof, such as a hamburger patty forming machine, to a point of use, the patties being shown in phantom lines.

Referring initially to FIG. 1, a preferred embodiment of the invention is illustrated and indicated generally at 20. The indexing conveyor system 20 includes a feed conveyor section, indicated generally at 22, for receiving articles or items which are rapidly dispensed from a source thereof (not shown). One such source for which the conveyor system 20 is particularly adapted for use is an apparatus for forming patties from an agglomerable, edible material, such as meat. Specifically, the feed conveyor section 22 is adapted to receive hamburger patties, illustrated in phantom lines and indicated generally at P, which are dispensed in rapid sequence from a patty-forming apparatus such as is disclosed and claimed in the Orlowski U.S. Pat. No. 4,065,241, issued Dec. 27, 1977, and in the Orlowski et al U.S. Pat. No. 4,193,167, both of which are assigned to the assignee of this application.

The indexing conveyor system 20 also includes a pivotal conveyor section 23 which, in the present instance, pivots between an upwardly inclined position and a substantially horizontal position. When in its substantially horizontal position illustrated in FIG. 1, the downstream or distal end of the pivotal conveyor section 23 is in proper alignment for delivering items being transported thereon to the lower receiving conveyor section 26 of the conveyor system 20 and, when in its upwardly inclined position, the pivotal conveyor section 23 is in proper alignment for delivering items being transported thereon to the upper receiving conveyor section, indicated at 24, of the system 20.

A pair of downwardly inclined take-off conveyor sections 27 and 28 are respectively disposed at one side of the upper and lower receiving conveyor sections 24 and 26 for receiving items, such as a row of hamburger patties illustrated in phantom lines and indicated at P, moving off of the receiving conveyor sections after their direction of movement has been changed by a direction changing mechanism, as will be described more fully hereinafter.

A final conveyor section 32 receives items discharging from the take-off conveyor sections 27 and 28 and serves to transport such items to a point of use. Where the indexing conveyor system 20 is being utilized to transport hamburger patties, the final conveyor section 32 may serve to transport the patties to a broiler (not shown) or a freezer (also not shown) and thence to a packaging machine (also not shown).

The structural details of each of the foregoing conveyor sections will now be described in detail.

The Feed Conveyor Section

Figure 2:
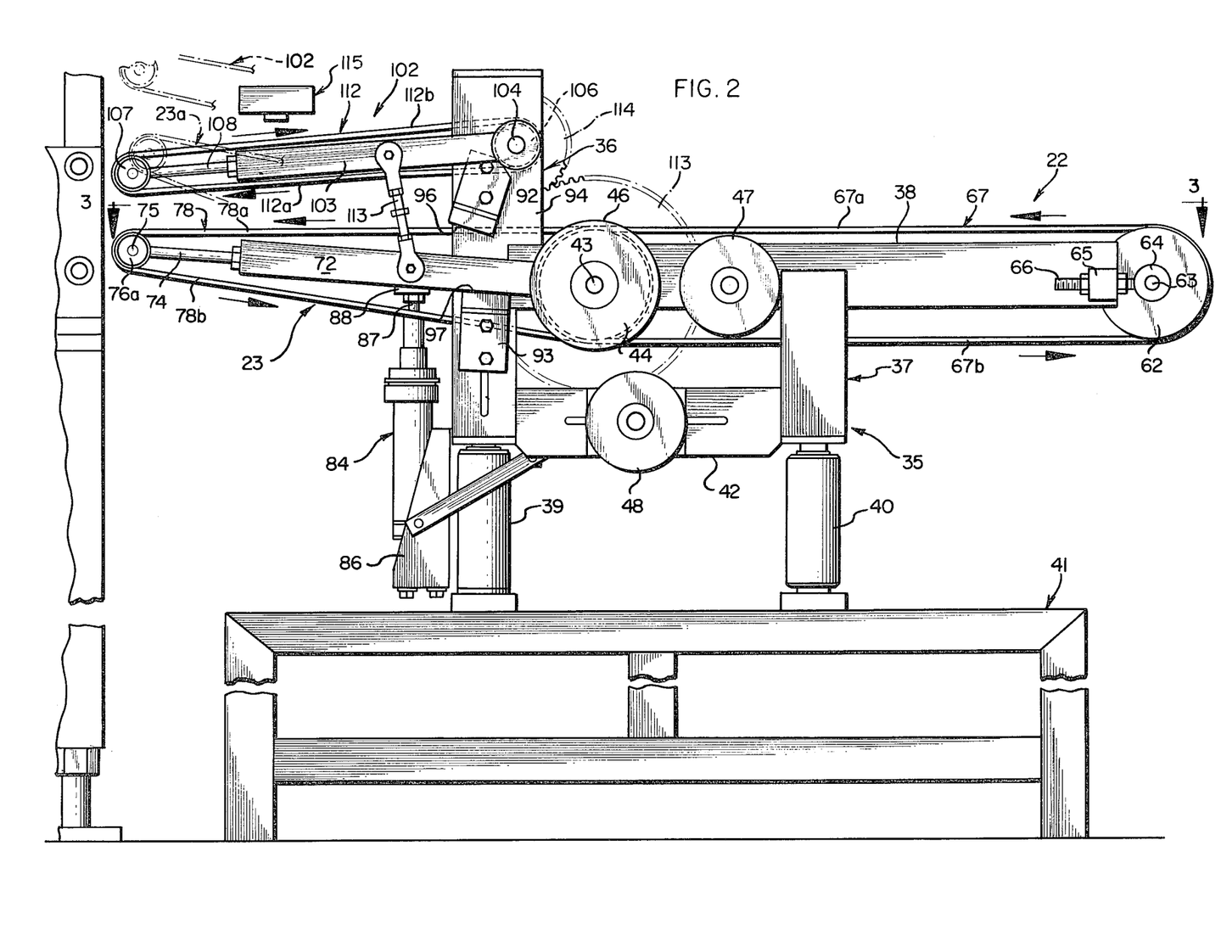
FIG. 2 is a side elevational view, with portions thereof broken away for clarity of illustration, of the feed conveyor section and pivotal conveyor section of the indexing conveyor system illustrated in FIG. 1.

Referring now to FIGS. 2 and 3 in conjunction with FIG. 1, it will be seen from FIG. 2 that both the feed conveyor section 22 and the pivotal conveyor section 23 are supported by a frame structure 35, which includes an upright, generally rectangular frame section 36, a longitudinally spaced, upright, U-shaped frame section 37, a pair of laterally spaced, longitudinally extending side portions 38, which are connected to the frame sections 36 and 37, and a portion 42 disposed below the side frame portions 38 and connected to the frame sections 36 and 37. The frame structure 35 is supported by a plurality of turnbuckles 39 and 40 which rest upon the upper surface of a base 41 of any suitable construction.

A drive shaft 43 extends transversely to and is rotatably supported in the side frame portions 38 adjacent the frame section 36, and a drum-type drive pulley 44 is secured to the drive shaft 43 for rotation therewith. Power is supplied to the drive shaft 43 through a drive sheave 46, which is driven by a belt (not shown) extending around idler sheaves 47 and 48 (FIG. 2).

Figure 3:
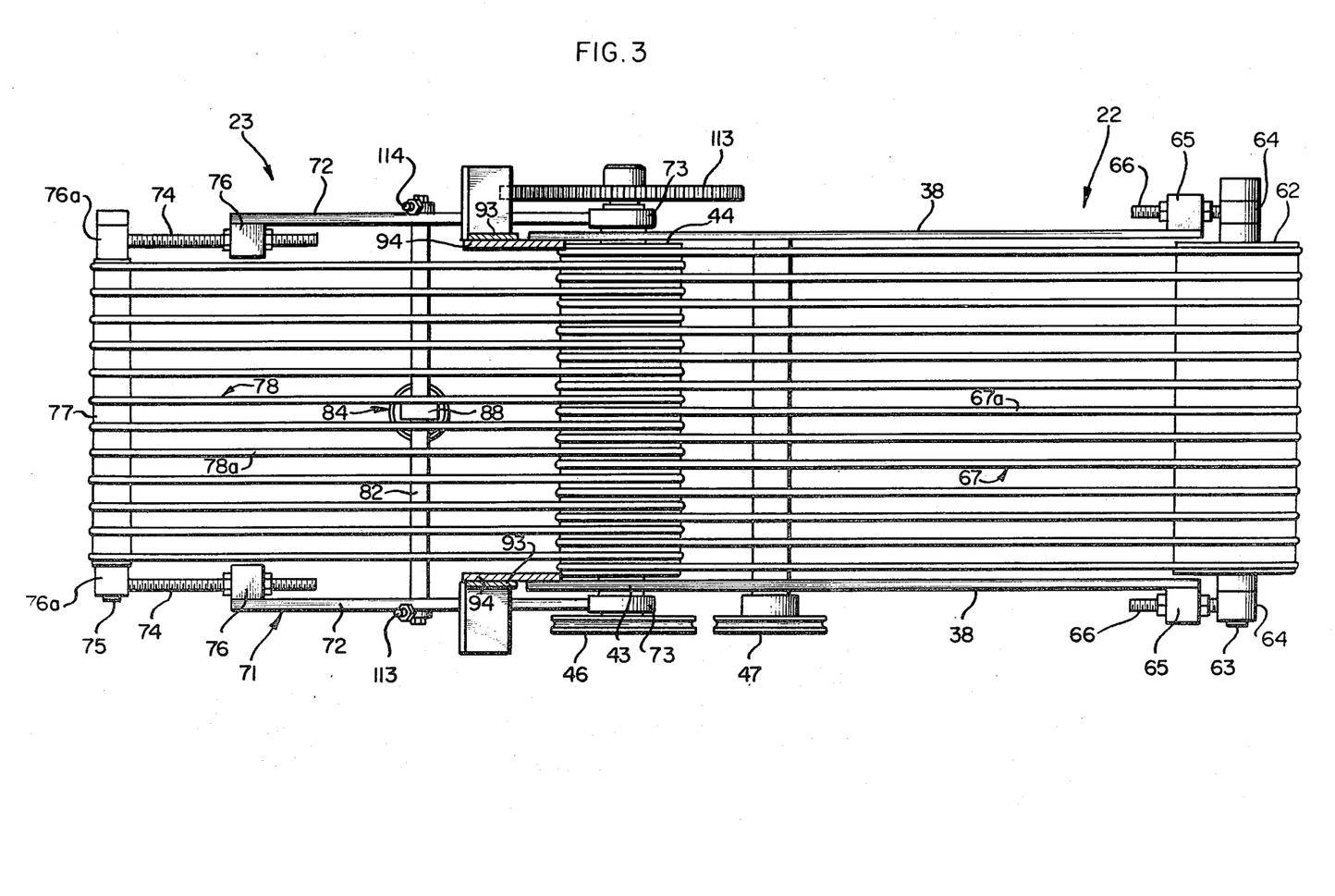
FIG. 3 is a top plan view taken substantially along the line 3—3 of FIG. 2.

As best seen in FIG. 3, the feed conveyor section 22 includes a drum-type tail pulley 62 mounted on a shaft 63 which is supported at the ends 64 of a pair of adjustable mounting arms 66 threaded into blocks 65 that are secured to the outer or right ends of the side frame portions 38 as viewed in FIGS. 2 and 3.

A plurality of laterally spaced, longitudinally extending, endless conveying elements in the form of belts 67 are engaged in grooves (not shown) in the outer surfaces of the drive pulley 44 and tail pulley 62 and thus are driven by the drive pulley 44. The direction of rotation of the drive pulley 44 is such that the upper portions or runs, indicated at 67a in FIGS. 2 and 3, move toward the left or toward the pivotal conveyor section 23. The belts 67 may be of any desired material capable of supporting and transporting the items deposited on the feed conveyor section 22. However, since the conveyor system 20 herein described is primarily suited for transporting items of food intended for human consumption, such as hamburger patties, the belts 67 are preferably of a non-toxic, resilient material, such as polyurethane.

Construction of the Pivotal Conveyor Section

The pivotal conveyor section 23 comprises a frame, indicated generally at 71, which includes a pair of laterally spaced, longitudinally extending arms 72 having annular mounting or support portions 73 at the right ends thereof, as viewed in FIGS. 2 and 3, for pivotally connecting the arms 72 to the drive shaft 43 of the drive pulley 44. The annular mounting or support portions 73 thus comprise the upstream or proximal ends of the frame 71. A pair of laterally spaced, longitudinally extending rods 74, which comprise adjustable extensions of the arms 72, are threaded into blocks 76 secured to the outer or left ends of the arms 72, as viewed in FIG. 3. A laterally extending shaft 75 is rotatably supported at its ends in bearing structures or blocks 76a carried at the left ends of the adjustable extensions 74 of the arms 72. A tail pulley 77 is mounted on the shaft 75 and comprises the downstream or distal end of the frame 71.

A plurality of longitudinally extending, laterally spaced, endless conveying elements in the form of resilient belts 78, are mounted in grooves in the tail pulley 77 and in the drive pulley 44. The grooves in the drive pulley 44, and hence the belts 78, are arranged in interdigital relationship with the belts 67 of the feed conveyor section 22. A crossbrace 82 extends between the arms 72 of the frame 71 and between the upper and lower runs or portions, indicated at 78a and 78b, respectively, of the belts 78.

According to the present invention, the indexing conveyor system 20 includes first actuating means for effecting rapid pivotal movement of the pivotal conveyor section 23 between an upwardly inclined or first position illustrated fragmentarily in phantom lines in FIG. 2 and indicated generally at 23a, and a generally horizontally extending or second position, illustrated in full lines in FIGS. 1 and 2. Such actuating means preferably comprises a pneumatic piston and cylinder assembly 84 having its lower end pivotally mounted in a bracket 86 secured to the frame section 36. The piston and cylinder assembly 84 includes an extensible and retractable plunger 87, the upper end of which, indicated at 88, pivotally connected to the crossbrace 82. Consequently, extension and retraction of the plunger 87 effects pivotal movement of the conveyor section 23 between the full and broken line positions thereof illustrated in FIG. 2. Fluid under pressure, such as compressed air, from a suitable source thereof is supplied to the cylinder of the piston and cylinder assembly 84 to effect extension of the plunger 87, and is vented from the cylinder to effect retraction thereof. A solenoid-actuated valve (not shown) may be used to control the pressurizing and venting of the cylinder. The solenoid-actuated valve is connected to an electrical circuit (also not shown) comprising part of a control means for controlling the operation of the indexing conveyor system 20.

Pivotal movement of the pivotal conveyor section 23 between its respective positions is limited by stop means in the form of a pair of brackets 92 and 93 on each of the upright portions, indicated at 94, of the rectangular frame section 36. Thus, pivotal movement of the pivotal conveyor section 23 is arrested when the upper and lower surfaces of the arms 72 engage the lower and upper edges, 96 and 97, respectively, of the brackets 92 and 93.

Because of the high rate of speed at which items are deposited on the feed conveyor section 22 and transported therealong onto the pivotal conveyor section 23, the pivotal conveyor section 23 is required to rapidly shift between its operating positions with respect to the receiving conveyor sections 24 and 26 so that the flow of items being deposited on the feed conveyor section 22 is not interrupted. Consequently, the upward acceleration force applied to the items being transported on the pivotal conveyor section 23 during upward pivotal movement thereof, and the inertia of the items during rapid downward pivotal movement of the conveyor section 23, might cause these items to be thrown off or otherwise ejected from the belts 78. According to the present invention, means in the form of a guard section, illustrated in FIG. 2 and indicated generally at 102, is provided for preventing loss of items on the pivotal conveyor section 23.

The Guard Section

The guard section 102 is similar in construction to that of the pivotal section 23 in that the guard section 102 comprises a frame having a pair of laterally spaced arms 103, which are pivotally mounted on a shaaft 104 that extends laterally between the upright portions 94 of the rectangular frame section 36. A drum-type pulley 106 is secured to the shaft 104 and is positioned between the upright portions 94 of the rectangular frame section 36. Another laterally extending, drum-type pulley 107 is rotatably supported at the outer ends of a pair of longitudinally extending extensions 108 threaded into blocks (not shown) carried at the outer ends of the arms 103. A plurality of laterally spaced, longitudinally extending endless conveying elements or belts 112 extend around the pulleys 104 and 107 and are received in circumferential grooves in these pulleys in the same manner as the belts 78 of the pivotal conveyor section 23. The belts 112 are preferably of the same material as the belts 67 and 78, i.e. polyurethane.

Since the guard section 102 is intended to arrest any relative upward movement of items being transported on the upper runs 78a of the pivotal conveyor section 23 during rapid upward and downward movements of the conveyor section 23, and to maintain the relative position of any items contacting the lower runs, indicated at 112a, of the belts 112, the pulley 106 of the guard 102 is driven in a direction opposite to that of the drive pulley 44. To this end, a gear 113 (FIGS. 2 and 3) is secured to the drive shaft 43 of the pulley 44, at the end thereof opposite from the end to which the pulley 46 is secured, and outwardly from the mounting portion 73 of the associated pivot arm 72. The gear 113 meshes with another gear 114, which is drivingly connected to the shaft 104. Consequently, the shaft 104 will rotate in the opposite direction from the shaft 43 so that the lower runs 112a of the belts 112 will move in the same direction as and at substantially the same speed as the upper runs 78a of the belts 78. The direction of movement of the lower and upper runs 112a and 112b, respectively, of the belts 112 is indicated by arrows in FIG. 2.

In order to assure movement of the guard section 102 in unison with pivotal movements of the pivotal conveyor section 23, at least one and preferably a pair of links 112 and 114 are secured at their respective ends to the arms 72 and 103 of the pivotal conveyor section 23 and guard section 102. The length of the links 113 and 114 may be adjusted in accordance with the various operating conditions and items to be transported by the conveyor system 20. The upwardly inclined position of the guard section 102 is illustrated in broken, phantom lines in FIG. 2 and indicated generally at 102a.

A photo-electric detector, indicated generally at 115 in FIG. 2, is mounted above the guard section 102 and is in the electrical circuit with the solenoid-actuated value which controls the operation of the piston and cylinder assembly 84. The photo-electric detector senses the presence of items on the upper portions 78a of the belts 78 and can be adjusted to provide a control signal for actuating the solenoid valve for the piston and cylinder assembly 84 so as to cause extension or retraction of the plunger 87 after a predetermined number of items have passed by the detector. The photo-electric detector 150 thus comprises another part of the control means for controlling the operation of the conveyor system 20. A photo-electric detector capable of performing the aforementioned function is manufactured and sold by Detecto Mfg. Co. of Los Angeles, California.

Construction of the Receiving Conveyors

Referring now to FIGS. 4, 5, 8 and 9, it will be seen that the lower receiving conveyor section 26 comprises a generally rectangular frame 122 having longitudinally extending, laterally spaced side portions 123 and 124 (FIG. 8) and longitudinally spaced, laterally extending end portions. The upper receiving conveyor section 24 likewise comprises a generally rectangular frame 125 (FIG. 4) having longitudinally extending, laterally spaced side portions 126 and 127 and longitudinally spaced, laterally extending end portions 128 and 129. The frame 125 rest upon and may be removed as a unit from the lower frame 122, as will be described fully hereinafter in connection with the description of the operation of the conveyor system 20. Since the principal components of the upper and lower receiving conveyor sections 24 and 26 are substantially identical, only the upper receiving conveyor section 24 will be described in detail. Like reference numerals have been used to identify the parts of the lower receiving conveyor section 26, which are identical with those of the upper receiving conveyor section 24.

As in the feed and pivotal conveyor sections 22 and 23, the upper receiving conveyor section 24 includes a pair of longitudinally spaced, laterally extending shafts 130 and 131, which are rotatably supported at their ends in the side portions 126 and 127 of the frame 125 adjacent to the end portions 128 and 129. A plurality of axially spaced pulleys 132 are mounted on the shafts 130 and 131, which may either be formed integrally with the shafts or separately. The pulleys 132 preferably have V-shaped grooves, the opposed surfaces of which are roughened, as by knurling or the like, to reduce slippage between the belts and pulleys, and are of stainless steel. A plurality of endless, resilient conveying elements or belts 133 engage the pulleys 132 and thus extend longitudinally of the frame 125. When engaged with the pulleys 132, the belts 133 include vertically spaced upper and lower portions or runs 133a and 133b, respectively.

In order to effect movement of the upper portions 133a of the belts 133 in one direction or toward the left end portion 129 of the frame 125, a gear 134 is secured to the outer end of the shaft 131. The gear 134 meshes with another gear 136 which is connected to the inner end of a shaft 137 that is rotatably mounted in an outer wall portion 138 of a U-shaped auxiliary frame secured to the side portion 126 of the frame 125. A drive sheave 139 is secured to the outer end of the shaft 137, and a belt 142 extends over the sheave 139 and another sheave (not shown) connected to a suitable power source, such as an electric motor (also not shown), mounted on a support frame, indicated generally at 145 in FIGS. 5, 8 and 9 for the receiving conveyor sections 24 and 26. The direction of rotation of the shaft 137 is such that the sheave 139 and gears 136 and 134 effect the aforementioned direction of movement of the upper runs 133a of the belts 133.

Mechanism for Changing Direction of Movement of Items on Receiving Conveyors According to the present invention, each of the receiving conveyors 24 and 26 includes mechanism for changing the direction of movement of items being transported thereon so that the items are transported off of the receiving conveyor sections in another direction transverse to the initial direction of movement of items onto the receiving conveyor section. Such mechanism is indicated generally at 150 in FIG. 4 and comprises a plurality of elongated, rotatable members or rods 152, which are preferably cylindrical and arranged with their axes parallel to each other and to the side portions 126 and 127 of the frame 125. The rods 152 are preferably formed in two sections, respectively indicated at 152a and 152b, and are drivingly connected to each other by tongue and groove joints, indicated generally at 153.

Figure 6:
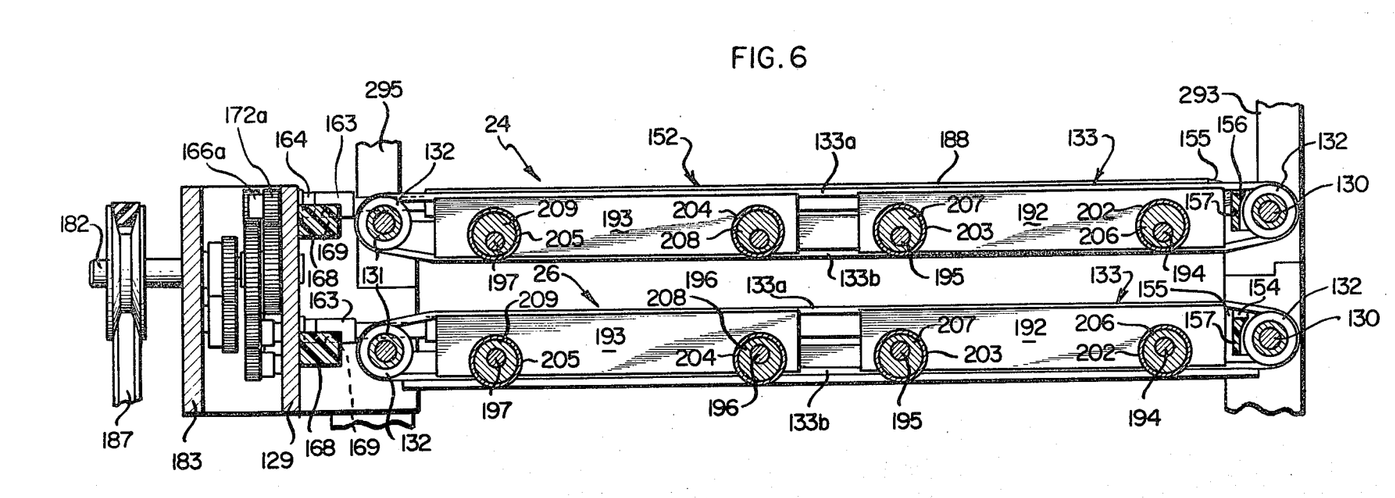
FIG. 6 is a longitudinal sectional view taken substantially along the line 6—6 of FIG. 4.
Figure 7:
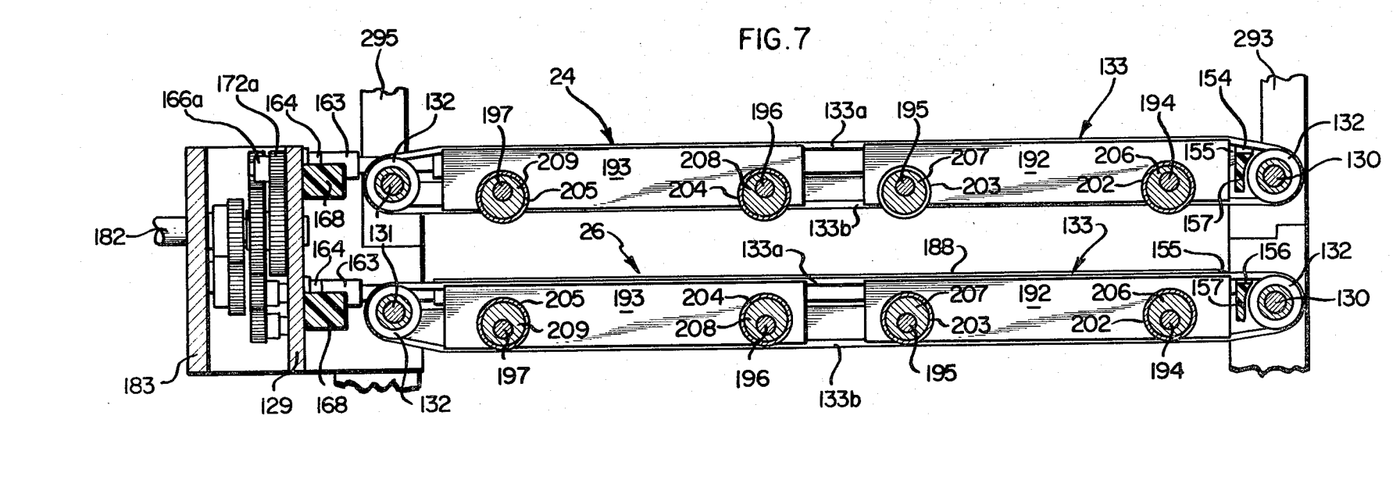
FIG. 7 is a view similar to FIG. 6 showing the parts thereof in different operating positions.

The upstream ends, indicated at 154, of the rod sections 152a are of a reduced diameter and are received in semi-cylindrical recesses 156 formed in a support member or bar 157, which extends transversely to the axes of rotation of the rods 152 and the side portions 126 and 127 of the frame 125. The portions of the rod sections 152 adjacent to the ends 154 are tapered as at 155 so as not to obstruct movement of items moving onto the receiving conveyor sections 24 and 26. As best seen in FIGS. 6 and 7, the upper surface, indicated at 156, of the support bar 157 lies in a plane through the horizontal diameters of the cylindrical end portions 154 of the rod sections 152a. Another support bar 162 extends between the side portions 126 and 127 of the frame 129 so as to underlie, engage and support the tongue and groove joints 153. The support bar 162 may be of any suitable bearing material such as nylon or the like.

Figure 4:
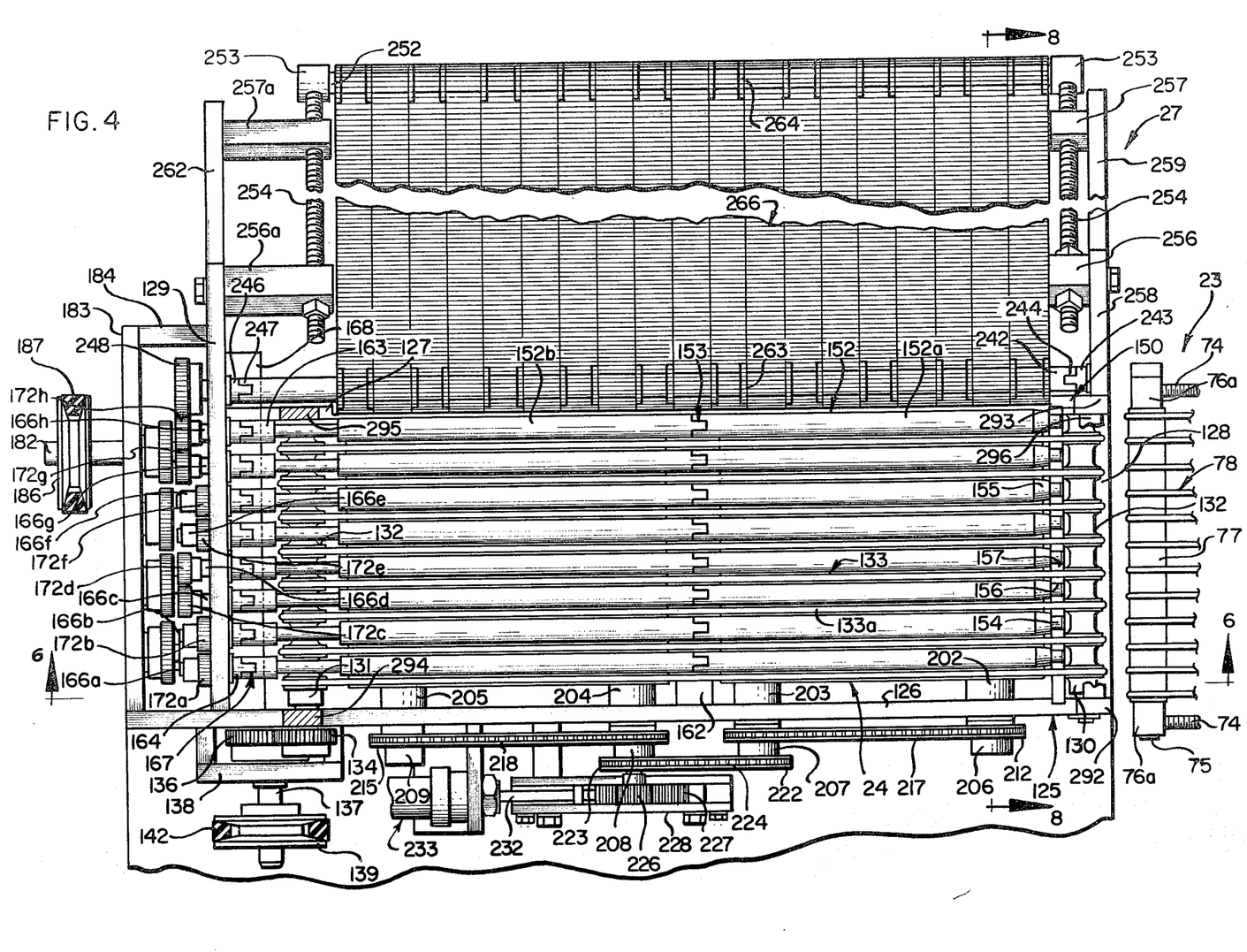
FIG. 4 is a top plan view, with portions thereof broken away to facilitate illustration thereof, of the upper receiving conveyor section and upper take-off conveyor section of the indexing conveyor system illustrated in FIG. 1.

The left or drive ends of the rod sections 152b are indicated at 163 in FIGS. 4, 6, and 7 and are connected to the inner or drive ends 164 of a plurality of longitudinally extending shafts 166a–166h by tongue and groove joints, indicated generally at 167. A support bar 168 having axially extending semi-cylindrical recesses 169 (FIG. 6) in the upper surface thereof is secured to the end portion 129 of the frame 125 and serves to support the drive ends 163 of the rod sections 152b when the latter are being driven and rotating. The support bar 168 is preferably of any suitable bearing material, such as nylon, or the like. The tongue and groove joints 153 and 167 permit the rod sections 152a and 152b to be lifted out of the frame 125 for purposes of inspection, cleaning or replacement.

Rotation of the shafts 166a–166h is effected by a gear train, which includes a plurality of spur gears 172a–172h (FIG. 4), respectively connected to the shafts 166a–166h. The gears 172a–172h are connected by intermediate gearing (not shown) and thence to a shaft 182 which is rotatably mounted in a wall portion 183 of a U-shaped frame 184 secured to the end portion 129 of the frame 125. A drive sheave 186 is secured to the shaft 182, and a belt 187 connects the sheave 186 with an other sheave (not shown) which may be driven by the same power source as that which drives the belts 67 and 78 of the feed conveyor 22 and pivotal conveyor 23. The direction of rotation of the sheave 186 is such that the upper surfaces, indicated at 188, of the rods 152 rotate toward the side portion 127 of the frame 125. Part of the gearing of the drive train which effects rotation of the rods 152 of the receiving conveyor 24 is also used to effect rotation of the rods 152 of the receiving conveyor 26.

According to the present invention, the direction changing mechanism 150 of each of the receiving conveyor sections 24 and 26 includes shiftable means for effecting movement of the central sections of the upper portions 133a of the belts 133 to depressed positions wherein the rotating rods 152 engage and convey items on the upper runs 133a of the belts 133 laterally off of the belts 133 and onto the respective take-off conveyors 27 and 28. Since the shiftable means of the direction changing mechanism 150 of the receiving conveyor 26 is constructed in the same manner as that employed in the receiving conveyor section 24, only the construction of the shiftable means of the receiving conveyor section 24 will be described in detail.

The shiftable means of the receiving conveyor section 24 comprises a pair of longitudinally spaced, oblong-shaped, plate-like members 192 and 193 (FIGS. 6 and 8) disposed between and engaging the central sections of the upper and lower portions or runs 133a and 133b of each of the belts 133. The upper and lower edges of the plate-like members 192 and 193 are recessed to receive and guide the central sections of the upper and lower runs 133a and 133b of the belts. The plate-like members 192 are mounted on a pair of longitudinally spaced, laterally extending shafts 194 and 195 (FIG. 6), and the plate-like members 193 are mounted on another pair of longitudinally spaced, laterally extending shafts 196 and 197 (FIG. 6). The shafts 194–197 extend through aligned bores in the plate-like members 192 and 193 so as to be freely rotatable therein.

The ends of the shafts 194–197 of the receiving conveyor section 24 are eccentrically secured to rotatable shafts 206–209 (FIGS. 4, 6 and 7), which are journalled in bushings 202–205, respectively. As will be apparent from FIG. 6, the centers of the shafts 194, 195, 196 and 197 of the receiving conveyor section 24 are disposed below the centers of their supporting bushings 202, 203, 204 and 205 when the upper portions 133a of the belts 133 are below the upper surfaces 188 of the rods 152, and the centers of the shafts 194, 195, 196 and 197 of the receiving conveyor section 26 are disposed above the centers of their supporting bushings 202, 203, 204 and 205 when the upper portions 133a of the belts 133 are above the upper surfaces 188 of the rods 152.

The shafts 206–209 extend through the side portions 126 of the frame 125 and have sprockets 212, 213, 214 and 215 secured thereto (FIG. 4). Chains 217 and 218 connect the sprockets 212 and 213 and 214 and 215, respectively. Another pair of sprockets 222 and 223 are mounted on the same shafts as the sprockets 213 and 215, i.e. the shafts 207 and 208, and a chain 224 connects the sprockets 222 and 223. A gear 226 is secured to the outer end of the shaft 208 and is meshed with a rack 227 for the upper receiving conveyor 24, the rack 227 being slidably mounted in the upper portion of a rectangular frame 228 secured to the side portion 123 of the frame 122. The teeth of the track 227 extend upwardly. Another rack 229 for the lower receiving conveyor section 26 is slidably mounted in the lower portion of the frame 228, with the teeth thereof extending downwardly.

Figure 5:
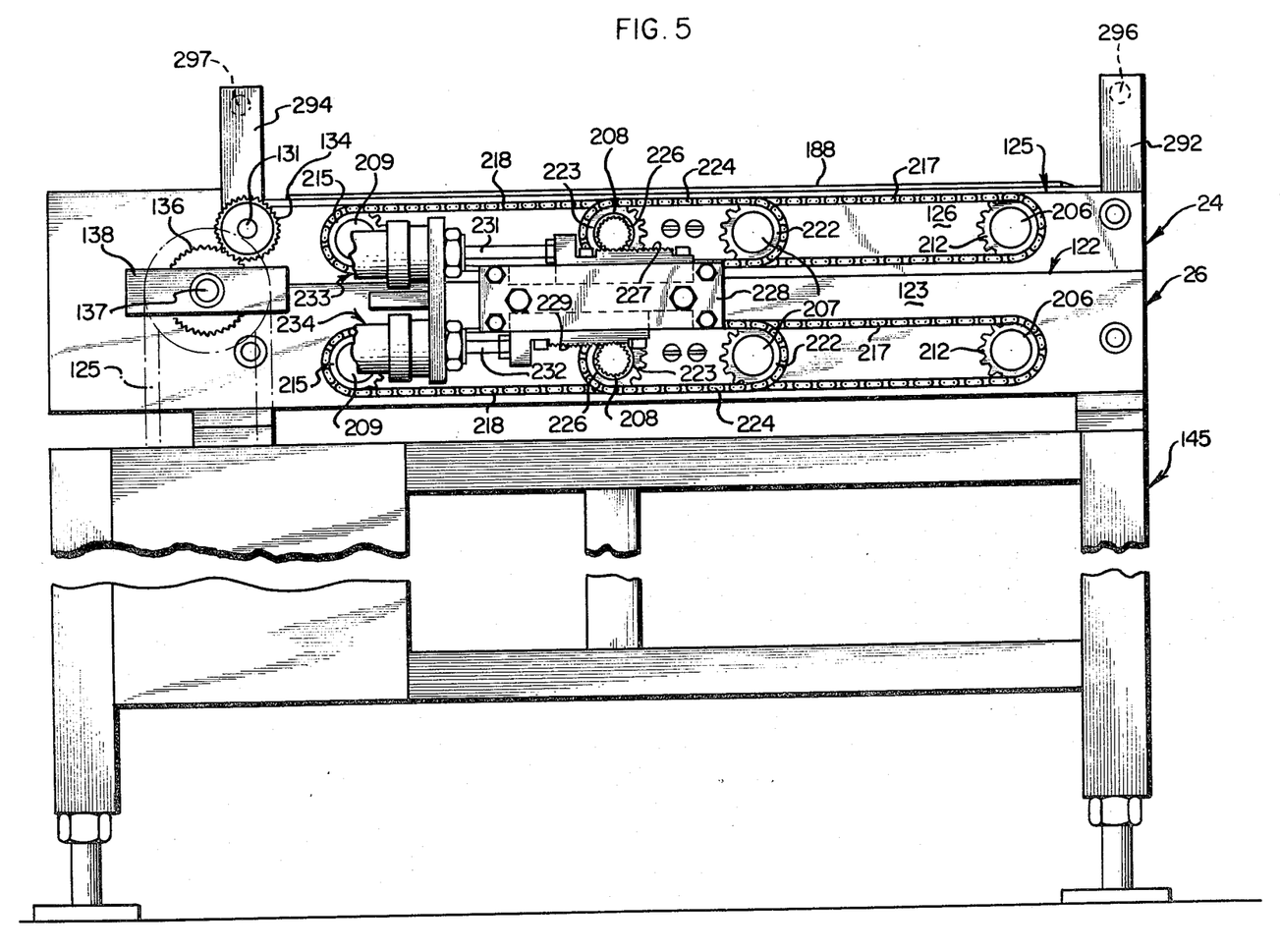
FIG. 5 is a side elevational view, with portions thereof broken away for clarity of illustration, of the tiered receiving conveyor sections of the indexing conveyor system illustrated in FIG. 1 and showing additional details of the mechanisms for changing the direction of movement of items being transported on the receiving conveyor sections.

As will be apparent from FIG. 5, the gear 226 engages the teeth of the rack 227 adjacent to the left end thereof, as viewed in FIG. 5. Conversely, the teeth of the gear 226 engage the rack 229 adjacent to the outer or right end thereof, as viewed in FIG. 5.

The left ends of the racks 227 and 229 of the receiving conveyor sections 24 and 26 are respectively connected to the outer ends of a pair of extensible and retractable plungers 231 and 232, which are part of a pair of piston and cylinder assemblies 233 and 234 mounted on the side portion 123 of the lower receiving conveyor frame 122. In the present instance, the plungers 231 and 232 act oppositely to each other, i.e. the plunger 231 is extended when the plunger 232 is retracted, as shown in FIG. 5, and vice versa. Such action is obtained as a result of alternately supplying fluid under pressure to one of the cylinders of the piston and cylinder assemblies 233 and 234 and substantially simultaneously venting the other of the cylinders of the assemblies 233 and 234. Pressurizing and venting of the cylinders of the piston and cylinder assemblies 233 and 234 to cause extension and retraction of the plungers 231 and 232 is effected by solenoid-actuated valves (not shown), which are in the electrical circuit that controls the operation of the solenoid-actuated valve for the piston and cylinder assembly 84.

The piston and cylinder assemblies 233 and 234 thus comprise actuating means for causing the shiftable means or plate-like members 192 and 193 to shift between their respective raised and lowered positions with respect to the upper surfaces 188 of the rotating rods 152. The manner in which the piston and cylinder assemblies 233 and 234 effect alternate raising and lowering of the central sections of the upper portions or runs 133a of the endless belts 133 of each of the receiving conveyor sections 24 and 26 so as to render the mechanisms 150 thereof operable to change the direction of movement of items being carried on the central sections of the upper portions 133a of the belts 133 will be described more fully in connection with the description of the operation of the conveyor system 20.

Construction of the Take-off Conveyor Sections

As previously mentioned, the indexing conveyor system 20 includes a pair of take-off conveyor sections 27 and 28, which are respectively disposed adjacent one side of the upper and lower receiving conveyor sections 24 and 26. In the present instance, the take-off conveyor sections 27 and 28 are arranged on the right sides of the receiving conveyor sections 24 and 26 with reference to the initial direction of movement of items on the receiving conveyor sections when the latter are viewed in plan.

Figure 8:
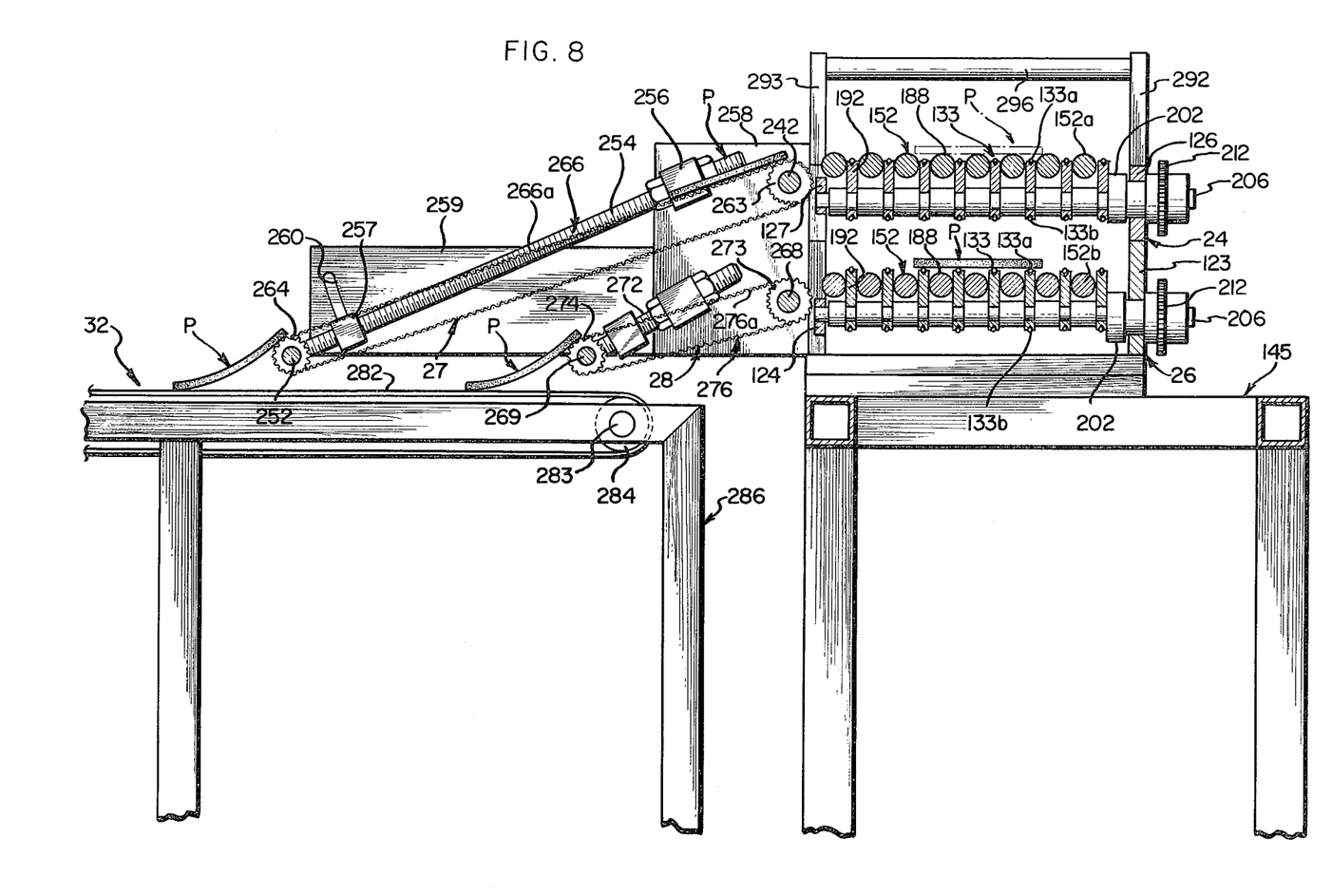
FIG. 8 is a transverse sectional view taken substantially along the line 8—8 of FIG. 4 and showing the relative positions of hamburger patties thereon.

Referring now to FIGS. 4 and 8 in conjunction with FIG. 1, it will be seen that the upper take-off conveyor section 27 comprises a shaft 242 which extends longitudinally of the frame 125 so that the axis thereof is parallel to the axes of the rotatable rods 152. The right end of the shaft 242, as viewed in FIG. 4, is preferably connected to a stub shaft 243 by means of a tongue and groove joint 244, and the opposite or left end of the shaft 242, as viewed in FIG. 4, is preferably connected to the end of another stub shaft 246 by means of a tongue and groove joint 247. The stub shaft 243 is rotatably mounted in the end portion 128 of the frame 125, and the stub shaft 246 is rotatably mounted in the end portion 129 of the frame. When connected to the stub shafts 243 and 246, the axis of the shaft 242 is parallel to that of the axes of the rods 152.

The outer end of the stub shaft 246 is provided with a gear 248 which meshes with one of the gears of the train which drives the gears 172a–172h. Thus, the shaft 242 is driven by the same power source as that which drives the rods 152.

The take-off conveyor section 27 includes another shaft 252 which is rotatably mounted at its ends in bearings 253 carried at the outer ends of a pair of rods 254, which are respectively threaded into pair of blocks 256, 257 and 256a, 257a. The blocks 256 and 257 are secured to a pair of extension plates 258 and 259, and the blocks 256a and 257a are respectively secured to the end portion 129 of the frame 125 and an extension plate 262 thereof. The blocks 256, 257 and 256a, 257a may be mounted in slots 260 (FIG. 8) in their respective support plates to permit adjustment of the angular position of the rods 254.

A plurality of axially spaced sprockets 263 are mounted on the shaft 242, and a plurality of axially spaced sprockets 264 are mounted on the shaft 252 for engaging and supporting an endless conveying element in the form of a wire belt 266. The belt 266 may be formed from an open mesh material manufactured and sold by the Wire Belt Company of America, Winchester, Massachusetts, and sold under the trademark "Flat-Flex".

The lower take-off conveyor section 28 is constructed in a similar manner to that of the upper take-off conveyor section 28 and therefore will not be described in detail. It will suffice to say that the lower take-off conveyor section 28 likewise comprises a shaft 268 (FIG. 8), which is supported at its ends in the same manner as the shaft 242 of the take-off conveyor section 27, and another longitudinally extending shaft 269, which is rotatably supported at its ends in bearing bushings (not shown) carried at the outer ends of a pair of outwardly and downwardly inclined, threaded rods, only one of which is illustrated in FIG. 8 and indicated at 272.

A plurality of axially spaced sprockets 273 and 274 are secured to the shafts 268 and 269, respectively, and an endless conveying element in the form of a wire belt 276 is meshed with and extends around the sprockets 273 and 274. The shaft 268 of the take-off conveyor 28 is driven by a gear (not shown) which meshes with one of the gears of the drive train for the rods 152.

Thus, when power is being supplied to the receiving conveyor sections 24 and 26 to effect rotation of the rods 152, the belts 266 and 276 are likewise driven and so that the upper runs, indicated at 266a and 276a of the belts will carry items being transferred thereto from one or the other of the receiving conveyor sections 24 and 26 toward the outer ends of the belts from which they are discharged onto the final conveyor section 32.

The Final Conveyor Section

As best seen in FIGS. 1 and 8, the final conveyor section 32 is conventional to the extent that it includes an elongated endless conveying element, preferably in the form of a wire belt 282, similar to the belts 266 and 276 of the take-off conveyor sections 27 and 28. The final conveyor belt 282 extends in the same direction as the belts 266 and 276 of the take-off conveyor sections 27 and 28 and has a width sufficiently great to receive items discharging in rows off of the take-off conveyor sections 27 and 28. The belt 282 is supported at intermediate points along its length by a plurality of laterally extending, longitudinally spaced shafts 283 having a plurality of axially spaced sprockets 284 thereon which mesh with the material of the belt 282. The shafts 283 are supported at their ends in a frame 286 and may be driven by the same power source which drives the conveyor sections 22, 23, 24 and 26, or by a separate power source.

Items discharging onto the upper portion, indicated at 282a of the belt 282 are transported thereon to a suitable point of use which may be a packaging apparatus or refrigerator when the items being transported are edible, such as hamburger patties.

Operation of the Indexing Conveyor System

Assuming that the various sections of the indexing conveyor system 20 have been properly positioned with respect to each other, the feed conveyor section 22 is positioned to receive items being dispensed at regular intervals from a source thereof, such as hamburger patties that have been formed by the molding apparatus disclosed in the aforementioned Orlowski, U.S. Pat. No. 4,065,241 and Orlowski et al U.S. Pat. No. 4,195,167, and further assuming that the electrical circuit which controls the various electrical components of the conveyor system 20 is energized, the indexing conveyor system 20 operates as follows:

As the hamburger patties fall onto the upper portions 67a of the polyurethane belts 67 of the feed conveyor section 22, the patties are transported in spaced relation, one behind the other, along the feed conveyor section 22 and thence onto the upper portions 78a of the endless belts 78 of the pivotal conveyor section 23.

Assuming that the pivotal conveyor section 23 is in its full line position illustrated in FIG. 2 and is feeding patties onto the lower receiving conveyor section 26, the relative position of the parts of the receiving conveyor sections 24 and 26 when the pivotal conveyor section 23 is transporting patties onto the lower conveyor section 26 is illustrated in FIGS. 5, 6 and 8. At this time, the central sections of the upper portions 133a of the endless belts 133 of the lower receiving conveyor section 26 are positioned above the upper surfaces 188 of the rotating rods 152. Such positioning results from upward shifting of the plate-like members 192 and 193, which are disposed between the upper and lower portions 133a and 133b of the belts 133 and which engage the the central sections of the upper and lower portions 133a and 133b along their upper and lower recessed edges.

It will be noted from FIG. 6 that, when the upper portions 133a of the belts 133 of the lower receiving conveyor section 26 are disposed above the upper surfaces 188 of the rods 152, the central sections of the upper portions 133a of the belts 133 of the upper receiving conveyor section 24 are disposed below the upper surfaces 188 of the rotating rods 152. Consequently, the rods 152 of the upper receiving conveyor section 24 will then be transporting any patties thereon laterally off of the conveyor section 24 and onto the associated, wire belt take-off conveyor section 27, as shown in FIGS. 1 and 8.

It will now be assumed that the photoelectric counter 115 has counted a predetermined number of patties moving thereunder on the pivotal conveyor section 23, which number corresponds to the maximum number that can be accommodated by the lower receiving conveyor section 26. The counter 115 then transmits an appropriate control signal to the associated electrical circuit which will cause the solenoid-actuated valve (not shown) for the piston and cylinder assembly 84 to admit air under pressure to the cylinder of the assembly 84. Such action causes the plunger 87 of the piston and cylinder assembly 84 to extend and rapidly pivot the pivotal conveyor section 23 to its upwardly inclined position illustrated in fragmentary phantom lines in FIG. 2 and indicated at 23a.

At the same time, the guard conveyor section 102, which is positioned closely above the pivotal conveyor 23 and which pivots therewith as a result of the interconnection of the conveyor sections 23 and 102 by the links 113 and 114 (FIGS. 2 and 3), will rapidly shift to its upwardly inclined position illustrated in broken, phantom lines and indicated at 102a. During the aforementioned rapid upward pivotal movement of the pivotal conveyor section 23, the guard conveyor section 102 performs its function of preventing patties on the conveyor section 23 from flying off of or otherwise being completely ejected from this conveyor section.

At the same time that the signal from the counter 115 causes the plunger 87 of the piston and cylinder assembly 84 to extend and rapidly pivot the pivotal conveyor section 23 to its upwardly inclined position, the solenoid-actuated valves (not shown) which control the pressurizing and venting of the piston and cylinder assemblies 233 and 234 will permit compressed air to be supplied to the cylinder of the assembly 234 and will vent the cylinder of the assembly 233. When this occurs, the plunger 232 of the assembly 234 will extend and the plunger 231 of the assembly 233 will retract. Consequently, the rack 229 of the assembly 234, which is meshed with the gear 226, will shift to the right and cause clockwise rotation of the gear 226 and sprocket 223, the gear 226 and sprocket 223 being connected to the shaft 208. Conversely, as the rack 227 shifts to the left, as viewed in FIG. 5, the gear 226 meshed therewith will rotate in a clockwise direction, as will the sprocket 223, which is secured to the same shaft as the gear 226.

Rotation of the sprockets 223 of the upper and lower receiving conveyors 24 and 26 in a clockwise direction effects similar movement of the associated sprockets 222, 213 and 212, and 214 and 215. Consequently, the shafts 206, 207, 208 and 209, and thus the shafts 194, 195, 196 and 197, of the upper and lower receiving conveyor sections 24 and 26 will rotate in a clockwise direction from the positions thereof illustrated in FIG. 6 to the positions thereof illustrated in FIG. 7. Such movement causes the plate-like shiftable members 192 and 193 of the upper and lower receiving conveyor sections 24 and 26 to shift from the positions thereof illustrated in FIG. 6 to the positions thereof illustrated in FIG. 7. When the plate-like members 192 and 193 are in their respective positions illustrated in FIG. 7, the central sections of the upper portions 133a of the belts 133 of the lower receiving conveyor section 26 are disposed below the upper surfaces 188 of the rotating rods 152 and the central sections of the upper portions 133a of the belts 133 of the upper receiving conveyor section 24 are disposed above the upper surfaces 188 of the rotating rods 152. Consequently, patties on the lower receiving conveyor section 26 will be engaged by the rotating rods 152 and transported laterally off of this receiving conveyor section onto its associated take-off conveyor section 28. At the same time, the central sections of the upper portions 133a of the belts 133 of the upper receiving conveyor section 24 will be effective to receive and transport patties along this conveyor section from the upwardly inclined pivotal conveyor section 23.

Patties will continue to move onto the upper receiving conveyor section 24 until the photoelectric detector 115 counts the predetermined number of patties for which it has been set. When this occurs, the photoelectric detector 115 will provide another signal to the associated electrical circuit which will cause the solenoid-actuated valve associated with the piston and cylinder assembly 84 to vent the cylinder of this assembly and cause rapid retraction of the plunger 87. Such movement effects rapid downward pivotal movement of the pivotal conveyor section 23 from its upwardly inclined position 23a to its substantially horizontal, full line position illustrated in FIG. 2. When so positioned, the tail pulley 77 of the pivotal conveyor section 23 is positioned to supply patties to the lower receiving conveyor section 26. During rapid downward pivotal movement of the pivotal section 23, the guard conveyor section 102 is effective to prevent patties on the upper receiving conveyor section 23 from flying off of and being completely ejected from the upper portions 78a of the belts 78 and also to maintain the relative position of any patties that might have lifted off of the upper portions 78a of the belts 78.

At the same time that the plunger 87 of the piston and cylinder assembly 84 is causing rapid downward pivotal movement of the pivotal conveyor section 23, the control signal from the photoelectric detector 115 energizes the solenoid control valves for the piston and cylinder assemblies 233 and 234 so that the cylinder of the assembly 234 is vented and the cylinder for the assembly 233 is pressurized. Consequently, the plunger 231 of the assembly 233 will extend to its full line position illustrated in FIG. 5 and the plunger 232 of the assembly 234 will retract to its full line position illustrated in the same figure. Extension of the plunger 231 from its former retracted position causes counterclockwise movement of the gear 226 meshed therewith and corresponding counterclockwise movement of the sprocket 233. The sprockets 222, 212, 213, 214 and 215 are correspondingly rotated in a counterclockwise direction to cause rotation of the shafts 206–209 and eccentric movement of the eccentrically mounted shafts 194–197 of the upper receiving conveyor section 24 to the full line positions thereof illustrated in FIG. 6. Consequently, the rotating rods 152 of the upper receiving conveyor section 24 will again become effective to transport patties laterally off of the upper receiving conveyor section 24 and onto the belt 266 of the upper take-off conveyor section 27, as illustrated in FIGS. 1 and 8.

Retraction of the plunger 232 of the piston and cylinder assembly 234 from its extended position to its full line retracted position illustrated in FIG. 5 takes place substantially simultaneously with extension of the plunger 231 of the piston and cylinder assembly 233. Such movement effects counterclockwise rotation of the gear 226 and the sprocket 223. This movement is transmitted to the sprockets 222, 212, 213, 214 and 215 to cause counterclockwise rotation of the shafts 206–209 as well as the shafts 194–197 of the lower, receiving conveyor section 26 from the positions thereof illustrated in FIG. 7 to their FIG. 6 positions. Consequently, the central sections of the upper portions 133a of the belts 133 of the lower receiving conveyor section 133 again becomes effective to transport patties being supplied thereto from the pivotal conveyor section 23 toward the left or downstream end of the receiving conveyor section until the detector 115 counts the predetermined number of patties to repeat the cycle of the system. The patties discharging from the belts of the take-off conveyor sections 27 and 28 are deposited onto the belt of the final conveyor section 32 and transported to a point of use, such as a refrigerator or a packaging machine.

Figure 9:
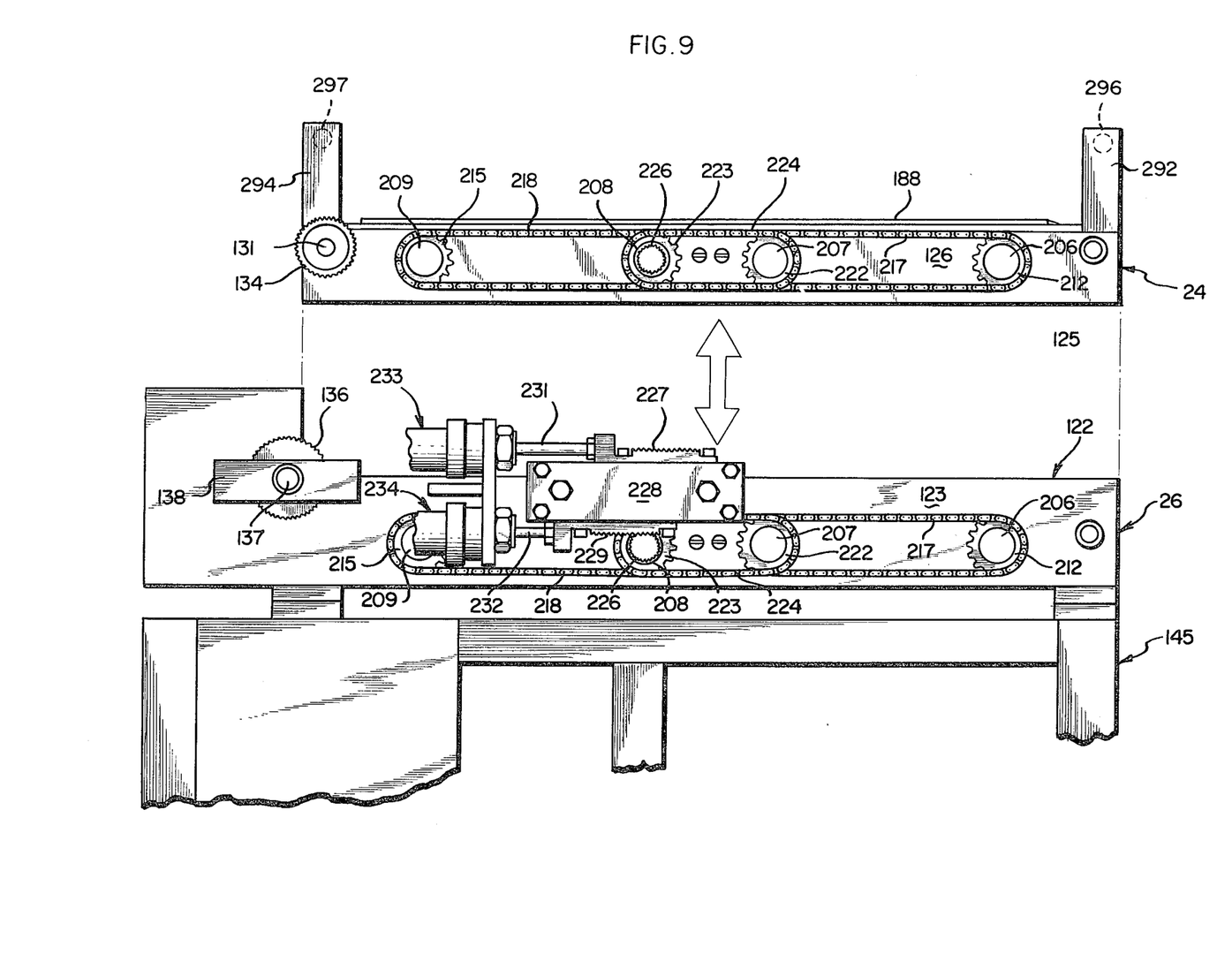
FIG. 9 is an exploded, side elevational view showing the manner in which the upper receiving conveyor section can be separated from the lower receiving conveyor section for purposes of inspection, cleaning or repair.

As will be apparent from FIG. 9, the upper receiving conveyor section 24 may be separated from the lower receiving conveyor section 26 to permit inspection, cleaning and replacement of the various components of the respective receiving conveyor sections. To facilitate such movement, the upper receiving conveyor section 24 is provided with a laterally spaced pair of upright posts 292 and 293 (FIG. 4) at the upstream end thereof and another pair of laterally spaced upright posts 294 and 295 at the downstream end thereof. Crossbars 296 and 297 respectively interconnect the upper ends of the posts 292, 293 and 294, 295. Thus, the upper receiving conveyor section 24 may be conveniently separated from the lower receiving conveyor section 26 by grasping the crossbars 296 and 297 and shifting the upper receiving conveyor section 24 upwardly away from the lower receiving conveyor section 26. When so separated, most of the components of the piston and cylinder assemblies 233 and 234 remain connected to the lower receiving conveyor section 26, as illustrated in FIG. 9.

From the foregoing description, it will now be apparent that, among its other advantages, the indexing conveyor system herein disclosed is capable of receiving items dispensed from a source thereof in a rapidly moving single column, and converting the rapidly moving column into slower moving rows or groups of items for easier handling.

It should be understood that while the piston and cylinder assemblies 84, 233 and 234 have been herein described as being of the single-acting type, i.e. the respective plungers 87, 231 and 232 thereof are extended by communicating fluid under pressure to the cylinders thereof and retracted by springs (not shown), which engage the pistons or plungers of the assemblies, double-acting piston and cylinder assemblies could also be used instead of the assemblies 84, 233 and 234. If double-acting piston and cylinder assemblies were used, the plungers which cause pivotal movement of the pivotal conveyor section 23 and vertical shifting of the plate-like members 192 and 193 of the receiving conveyor sections 24 and 26, would be forcefully shifted between their extended and retracted positions instead. Such construction and mode of operation is, therefore, contemplated by the present invention.

While only one embodiment of the invention has been herein illustrated and described, it will be understood that modifications and variations thereof may be effected without departing from the spirit of the invention or the scope of the appended claims.

We claim:

1. A conveyor system for receiving items that are rapidly dispensed at intervals from a source thereof and transporting the same to a point of use, said system comprising an elongated feed conveyor section for initially receiving and rapidly transporting said rapidly dispensed items, said feed conveyor section having upstream and downstream ends and transversely extending shafts at said ends, pulley means mounted on said shafts, a plurality of longitudinally extending, laterally spaced endless conveying elements engaged with the pulley means on said feed conveyor section shafts, a plurality of receiving conveyor sections spaced from said feed conveyor section and arranged in tiers, said feed conveyor sections each having upstream and downstream ends and being adapted to receive rapidly moving items being transported by said feed conveyor section, a pivotal conveyor section operatively disposed between said feed conveyor section and said receiving conveyor sections and being rapidly pivotal between positions for directing a predetermined number of items onto each of said receiving conveyor sections, said pivotal conveyor section including a frame having proximal and distal ends, the distal end of said frame having a shaft extending transversely thereacross, the proximal end of said frame being pivotally connected to the shaft at the downstream end of said feed conveyor section, pulley means mounted on the shaft at the distal end of said frame, a plurality of longitudinally extending, laterally spaced endless conveying elements engaged with the pulley means at the downstream end of said feed conveyor section shaft and with the pulley means on the shaft at the distal end of said frame, the ends of the endless conveying elements of said feed and pivotal conveyor sections that are engaged with the pulley means at the downstream end of said feed conveyor section being arranged in alternating, interdigital relation, a guard section connected to said pivotal conveyor section for movement therewith, said guard section normally being spaced from but closely overlying items being transported on said pivotal conveyor section so as to avoid unnecessary and undesirable contact with said items and to prevent complete ejection of said items during rapid movements of said pivotal conveyor section actuating means connected to the frame of said pivotal conveyor section and operable to effect said rapid pivotal movements of said pivotal conveyor section between its respective positions wherein the distal end thereof is sequentially aligned with said receiving conveyor sections, and drive means for effecting rapid movement of the endless conveying elements of said feed and pivotal conveyor sections.

2. The conveyor system of claim 1, in which the frame of said pivotal conveyor section includes a pair of laterally spaced, longitudinally extending arms having extensions secured to the downstream ends thereof, the transversely extending shaft at the distal end of said frame is carried at the downstream ends of said extensions, the endless conveying elements of said pivotal conveyor section are of a resilient material, and said extensions are adjustably mounted on the downstream ends of said arms, whereby the longitudinal spacing between the the shaft at the downstream end of said feed conveyor section and the shaft at the distal end of said frame is adjustable to permit adjustment of the tension in the endless conveying elements of said pivotal conveyor section.

3. The conveyor system of claim 1, in which said guard section includes a frame mounted for pivotal movement about one end, and at least one link interconnects said pivotal conveyor section frame with said guard section frame so that a substantially fixed spacing is maintained between said frames during pivotal movement of said pivotal conveyor section frame and said guard section frame.

4. The conveyor system of claim 3, in which the length of said link is adjustable so as to permit adjustment of the space between said guard conveyor section frame and said pivotal conveyor section frame.

5. The conveyor system of claim 1, in which the endless conveying elements of said pivotal section have upper and lower portions, said guard section includes a plurality of endless conveying elements, and means is provided for driving the upper portions of the conveying elements of said pivotal section and the overlying lower portions of the conveying elements of said guard section in the same direction.

6. The conveyor system of claim 5, in which said drive means drives the lower portions of the conveying elements of said guard section at substantially the same speed as the upper portions of the conveying elements of said pivotal conveyor section.

7. Mechanism for changing the direction of movement of rapidly dispensed friable items, such as hamburger patties, moving in one direction on a conveyor or the like to another direction substantially transverse to said one direction, said mechanism comprising a plurality of longitudinally extending, laterally spaced, endless, resilient belts extending in said one direction and having vertically spaced upper and lower portions, means for driving said belts in unison and so that the upper portions thereof move in said one direction, a plurality of elongated, laterally spaced rotatable members arranged with their axes extending in said one direction and respectively disposed between the upper portions of said endless belts, portions of said elongated, rotatable members adjacent to the upstream ends thereof being tapered so as not to obstruct movement of items moving in said one direction and onto said elongated, rotatable members, shiftable means engaging the central sections of the upper portions of said endless belts, at least between said rotatable members, and operable to shift only said said central sections to positions disposed above the upper surfaces of said elongated rotatable members, said shiftable means also being operable to effect movement of said said central sections of said belts to depressed positions wherein said said central sections are disposed below the upper surfaces of said elongated rotatable members, and means for effecting rotation of said rotatable members so that the upper surfaces thereof move in said other direction, whereby items being transported in said one direction by the elevated central sections of said endless belts will be caused to move in said other direction when said shiftable means effects movement of said central sections of said endless belts to said depressed positions so that said items engage the upper surfaces of said rotating, elongated, rotatable members.

8. The mechanism of claim 7, in which said elongated rotatable members comprise a plurality of elongated rods having upstream and downstream ends, the axes of rotation of said rods being parallel to each other and to the upper portions of said endless belts, the upstream end of each of said rods includes a reduced diameter, cylindrical bearing portion, a support member extends transversely to the axes of rotation of said rods, and said support member underlies and engages the reduced diameter portions of said rods.

9. The mechanism of claim 7, in which said shiftable means comprises a plurality of elongated, vertically arranged plate-like members disposed between the upper and lower portions of said endless conveying elements and having their upper edges engaging at least the central sections of the upper portions of said endless belts.

10. The mechanism of claim 9, in which the upper and lower edges of each of said plate-like members are recessed to receive and guide the central sections of the upper and lower portions of said endless belts.

11. The mechanism of claim 9, in which actuating means is provided for vertically shifting said plate-like members in unison between their elevated and depressed positions, the elevated positions of plate-like members corresponding to the elevated positions of the central sections of the upper portions of said endless belts.

12. A conveyor system for receiving rapidly dispensed items at intervals from a source thereof and transporting said items to a point of use, said system comprising a feed conveyor section for initially receiving said dispensed items, at least a pair of receiving conveyor sections, arranged in tiers, for receiving items from said feed conveyor section and transporting said items in one direction, each of said receiving conveyor sections having a plurality of endless belts extending in said one direction, a pivotal conveyor section operatively disposed between said feed and receiving conveyor sections, first actuating means connected to said pivotal conveyor section for rapidly shifting the latter to a first position wherein items are transported by said pivotal conveyor section substantially in said one direction and are delivered to one of said receiving conveyor sections, said first actuating means also being operable to rapidly shift said pivotal conveyor section to a second position wherein items are transported by said pivotal conveyor section substantially in said one direction and are delivered to the other of said receiving conveyor sections, a guard section connected to and movable with said pivotal conveyor section, said guard section normally being spaced from but closely overlying said items being transported on said pivotal conveyor section so as to avoid unnecessary and undesirable contact with said items and being operable to prevent items on said pivotal conveyor section from being completely ejected therefrom during rapid movements of said pivotal conveyor section, a plurality of elongated rotatable members disposed between the endless belts of each of said receiving conveyor sections and extending in said one direction, said rotatable members being operable when rotating and engaged with items being transported by said endless belts to cause said items to move in a direction transverse to said one direction, shiftable means associated with each of said receiving conveyor sections for shifting portions of the endless belts thereof to a first position wherein items on the receiving conveyor section are transported solely by said endless belts in said one direction, said shiftable means also being operable to effect movment of said portions of said belts to a second position wherein items being transported by the associated receiving conveyor section are supported only by said elongated rotating members and are thus caused to move in said transverse direction, second actuating means operatively connected to the shiftable means of one of said receiving conveyor sections for effecting operation of said shiftable means and movement of said portions of said belts between their respective positions, third actuating means operatively connected to the shiftable means of the other of said receiving conveyor sections for effecting operation of said shiftable means and movement of said portions of said belts between their respective positions, and control means for effecting substantially simultaneous operation of said first, second and third actuating means.

13. The conveyor system of claim 12, in which said second actuating means causes its associated shiftable means to move said portions of said belts to said first position when said third actuating means causes its associated shiftable means to effect movement of said portions of its associated belts to said second position, and vice versa.

14. The conveyor system of claim 13, in which said pivotal conveyor section is aligned with the upper one of said tiered receiving conveyor sections when said pivotal conveyor section is in said first position and with the lower one of said tiered receiving conveyor sections when said pivotal conveyor section is in said second position, said second actuating means causes its associated shiftable means to shift the shiftable portions of said belts of said upper receiving conveyor section to said first position when said pivotal conveyor section is in said first position, and said third actuating means causes its associated shiftable means to shift the shiftable portions of said belts of said lower receiving conveyor section to said second position when said pivotal conveyor section is in said first position.

15. The mechanism of claim 11, in which said actuating means for vertically shifting said plate-like members includes at least one eccentrically mounted shaft extending transversely through aligned bores in said plate-like members, a pinion is secured to one end of said shaft, an extendable and retractable rack is meshed with said pinion, and operating means is connected to said rack for effecting movement thereof in opposite directions and vertical shifting of said plate-like members between their elevated and depressed positions.

16. The mechanism of claim 15, in which a longitudinally spaced pair of said eccentrically mounted shafts extend transversely through corresponding aligned bores in said plate-like members, said pinion is secured to one of said shafts, a sprocket is secured to each of shafts, and a chain extends around said sprockets, whereby movement of said rack in opposite directions effects simultaneous movement of said eccentrically mounted shafts in opposite directions and vertical shifting of said plate-like members between their elevated and depressed positions.

* * * * *